United States Patent [19]

Herrington

[11] Patent Number: 4,623,323
[45] Date of Patent: Nov. 18, 1986

[54] ROTATING DISK INTERMITTENT ORIENTOR FOR DRAW TAPE

[75] Inventor: Fox J. Herrington, Holcomb, N.Y.

[73] Assignee: Mobil Oil Corporation, New York, N.Y.

[21] Appl. No.: 795,578

[22] Filed: Nov. 6, 1985

[51] Int. Cl.$^4$ ............................................. B05B 43/00
[52] U.S. Cl. .................................... 493/338; 493/225; 493/927
[58] Field of Search ............... 493/198, 211, 215, 927, 493/338, 225, 226, 926, 927; 26/71; 28/243; 264/288.2, 290.2

[56] References Cited

U.S. PATENT DOCUMENTS

| | | | |
|---|---|---|---|
| 3,772,968 | 11/1973 | Ruda | 493/225 |
| 3,859,895 | 1/1975 | White | 493/225 |
| 4,523,918 | 6/1985 | Ausnit | 493/927 |

Primary Examiner—Leon Gilden
Attorney, Agent, or Firm—Alexander J. McKillop; Michael G. Gilman; Charles J. Speciale

[57] ABSTRACT

Thermoplastic tape is stretched by a rotating disk having slots extending radially outward from the center of rotation of the disk. The tape is gripped by clips which are moved outwardly in the slots by a cam slot as the disk rotates. The clips grip the tape throughout a length which forms relatively thick and wide unstretched portions of tape with relatively thin and narrow central portions of stretched tape between said clips.

10 Claims, 5 Drawing Figures

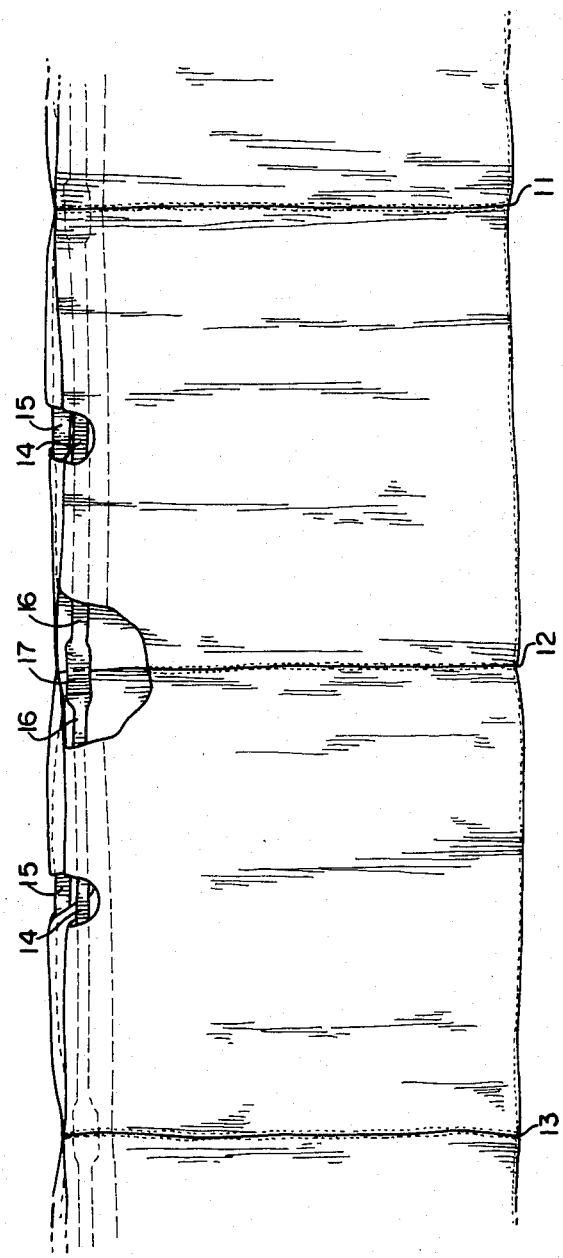
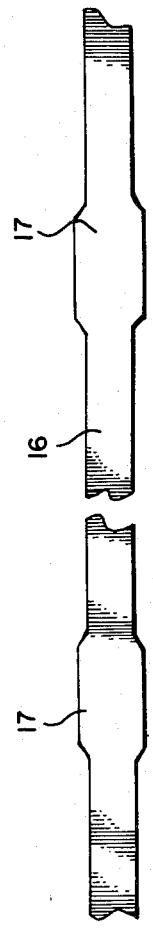
FIG. 1
FIG. 1A

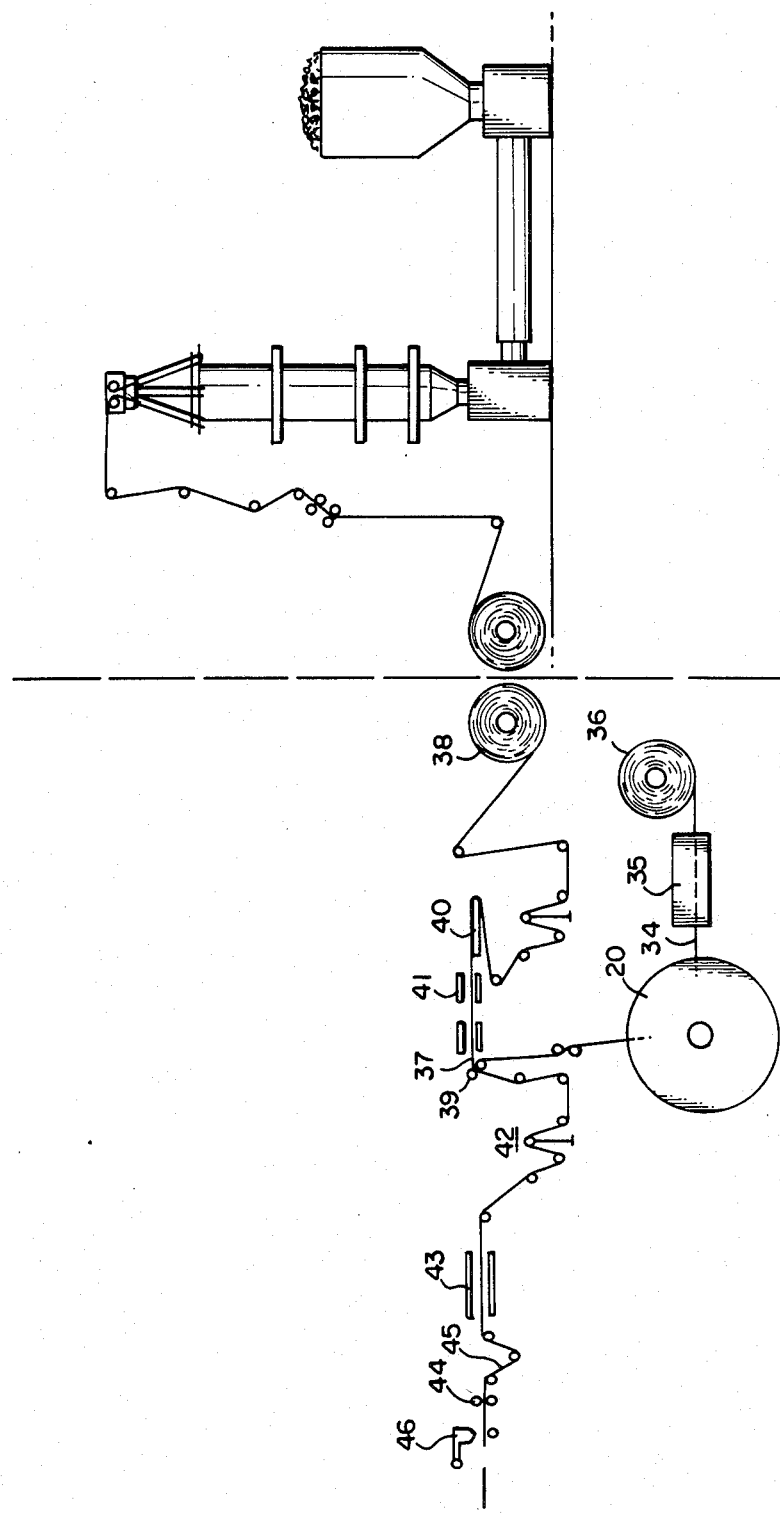

4,623,323

ROTATING DISK INTERMITTENT ORIENTOR FOR DRAW TAPE

BACKGROUND OF THE INVENTION

This invention relates to the manufacture of draw tape for thermoplastic bags, and more particularly, to making an intermittently stretched and oriented draw tape.

Bags made of thin polyethylene material have been used in various sizes. Small bags are used in the packaging of sandwiches and the like; larger bags are used as shopping bags; and even larger bags are used for containing trash.

A particularly advantageous closure for such a bag includes a draw tape constructed from the same polyethylene material. U.S. Pat. No. 3,029,853—Piazzi, and British Patent No. 1,125,363—Jortikka are examples of draw tape bags. Such closures have been successfully employed on these bags.

Draw tape closures for large trash bags, and the manufacture of these draw tape trash bags, are described in the related applications identified below.

In such bags, the tape is preferably unoriented polyethylene which is heat sealed to the opposing panels of the bag at the sides thereof. The weakest part of the draw tape is at the heat seal. This weak point should be located at the point of lowest tensile load, which is furthest from where the user pulls the tape. For this reason, the tape is normally in a hem with a notch at the center of the bag, so that the user grasps the tape at a point furthest from the heat seal.

Economy of manufacture is one of the prime considerations in these bags. The cost of the draw tape is a significant part of the total bag cost, so that any economies in draw tape cost advantageously reduce the ultimate cost of the bag.

As more fully set forth in the Herrington application identified below, an improved draw tape for trash bags of this type has a stretched relatively thin central portion between unstretched, relatively thick and wide end portions of the tape. The end portions are heat sealed at the sides of the bag. This stretched tape has an economic advantage and improved load carrying characteristics.

It is an object of the present invention to provide a method of and apparatus for intermittently stretching thermoplastic tape to produce such draw tapes for bags.

It is another object of the present invention to provide tape stretching apparatus with mechanical simplicity and no reciprocating parts.

RELATED APPLICATIONS

"METHOD & APPARATUS FOR MANUFACTURING DRAW TAPE BAGS", Boyd, et al, Ser. No. 652,254, filed Sept. 20, 1984 describes an overall draw tape bag manufacturing line; "METHOD & APPARATUS FOR FORMING HEMS IN SUPERPOSED PLIABLE PANELS", Boyd et al, Ser. No. 652,255, filed Sept. 20, 1984, describes a hem forming apparatus used with the line; "INSERTION OF DRAW TAPE STRIPS IN DRAW TAPE BAG MANUFACTURE", Boyd, et al, Ser. No. 652,252, filed Sept. 20, 1984, describes the apparatus for inserting the draw tape into the bag. "BAG HAVING INTERMITTENT ORIENTATION DRAW TAPE", Herrington, Ser. No. 722,045, filed 4-11-85, describes an intermittently oriented draw tape. The foregoing applications are incorporated herein by reference.

SUMMARY OF THE INVENTION

In accordance with the present invention, thermoplastic tape is stretched with a rotating disk having radial slots which guide clips. A stationary cam adjacent to the disk guides the clips. Unoriented tape is clamped by the clips while they are close to the center of the disk. As the disk rotates, the cam forces the clips to a larger radius, a greater distance apart, stretching the tape between the clips. In this manner, the tape is stretched to produce relatively thin and narrow portions while the segments of the tape held by the clips remain unoriented and unstretched.

The draw tape is inserted into the hem of a bag and the thick and wide, unoriented, end portions of the tape are heat sealed at the sides each bag. In this manner, stretched, oriented, tape forms the bag carrying handle but the tape is heat sealed in unstretched, unoriented portions of the tape.

The apparatus of the present invention is easily synchronized with the bag making apparatus which includes means for slitting a tube of extruded polyethylene, forming a hem in the continuous length of film, inserting the draw tape into the hem, heat sealing the tape and the sides of the bag and severing the continuous length of film into individual bags.

The present invention has the advantage of mechanical simplicity with no reciprocating parts except the clips. The motion is continuous. Another advantage is that the stretching can take place over a period of time which is longer than the cycle time of the bag making machine. For example, a typical bag making machine produces a bag every one-half second. The present invention allows four pieces of tape, for example, to be stretched at any time so the actual time allowed for the stretching is two seconds.

The foregoing and other objects, features and advantages of the invention will be better understood from the following more detailed description and appended claims.

SHORT DESCRIPTION OF THE DRAWINGS

FIGS. 1 and 1A show a series of bags with the draw tape made in accordance with the present invention;

FIG. 4 depicts a manufacturing line for the bags which includes the apparatus of the present invention for stretching the tape prior to insertion into the bags.

DESCRIPTION OF THE PREFERRED EMBODIMENT

FIGS. 1 and 1A show bags for carrying trash and the draw tape for them. They include two panels which are formed from an extruded tube of polyethylene. The sides of the panels are heat sealed and cut from the tube at 11, 12 and 13 in a perpendicular direction. The tube is slit along one side to form open tops in the bag for reception of trash and the like. Hem portions of each panel are folded over adjacent the top. Draw tapes 14 and 15 are secured by the heat seal at the sides of the panels. A cut-out in each panel and hem portion at the middle of the bag, exposes the draw tapes so they can be grasped. When the bag is loaded with trash, the bag is grasped by the draw tape, thereby closing the bag. The draw tapes can thereafter be tied forming a neat bundle.

The draw tape has a relatively thin and narrow central portion 16 of stretched, oriented, polyethylene and end portions 17 at the extremities. The relatively thick and wide end portions are unstretched, unoriented, polyethylene tape. The heat seal which secures the draw tape to the sides of the panels is through the relatively thick and wide end portions.

Figure 2:
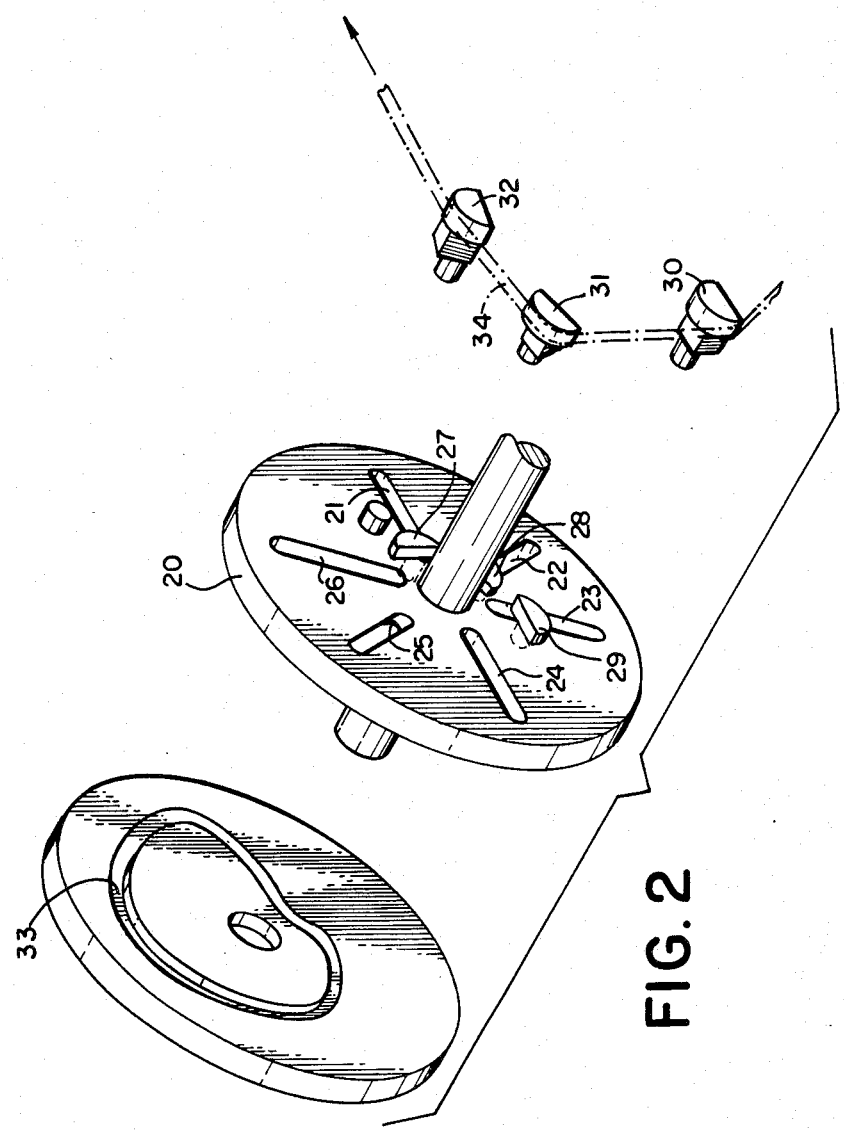
FIG. 2 is an exploded view of the disk and cam.
Figure 3:
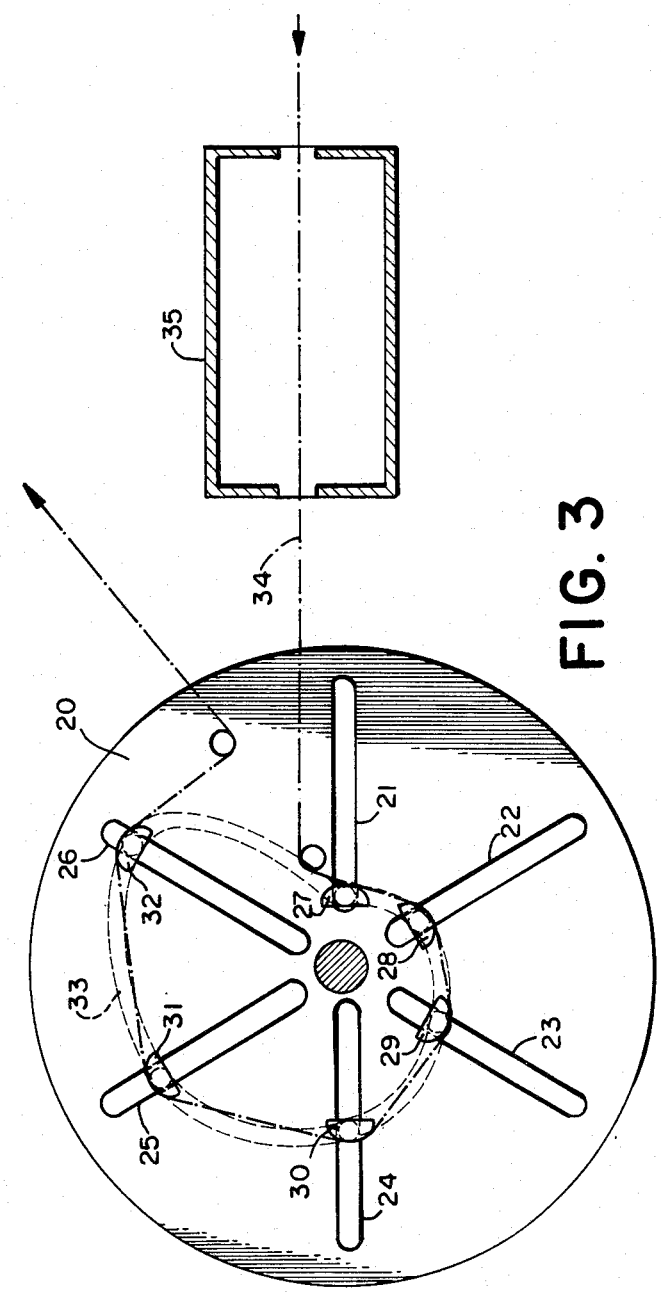
FIG. 3 shows the disk of the present invention used to stretch tape.

Referring to FIGS. 2 and 3, the present invention includes a rotating disk 20, about six feet in diameter in the exemplary embodiment. Six radial tracks, which are the slots 21-26, guide clips 27-32 radially along the tracks. A stationary cam, having a groove 33 which extends in a spiral, is positioned adjacent to the rotating disk. The groove 33 positions the clips radially. As the disk rotates, the clips move further from each other as determined by the radius at which the cam positions them.

Unoriented tape 34 (FIG. 3) from the oven 35 is fed to the clip 27 which is closest to the center of rotating disk 20. The tape 34 is heated in oven 35 in order to avoid line drawing and to obtain smooth stretching and orientation of the tape.

As the disk rotates, the clips 27-32 move farther from each other, stretching the tape between the clips, while the segments of the tape held by the clips remains unoriented.

In an exemplary embodiment, a tape for a thirty inch wide bag has a two inch unstretched end portion in every thirty inches. A six foot diameter disk with six radial tracks produces a stretch ratio for the 28" portions of stretched tape of 5:1. More or less than six tracks may be used but the stretching diameter must be proportionally more or less than six feet.

FIG. 4 shows the apparatus of the present invention with bag making machine. Polyethylene tape from the roll 36 is stretched by the rotating disk 20 of the present invention after it has passed through the oven 35.

The stretched tape is fed to the tape inserter 37 where it is inserted into the hem of a continuously moving line of bags. In order to operate the tape stretching apparatus of the present invention in line with this bag making machinery, it is necessary to synchronize the tape stretcher with the bag machine in two respects:

1. Cyclic register: There must be exactly one interruption for every cycle of the bag machine. This can be accomplished by driving the disk relative to the crank in the bag machine which advances the bags so the disk makes one revolution for every six rotations of the bag machine crank, and therefore every six bags.

2. Linear speed match: The linear speed of the exiting oriented tape must be the same as the speed of the film entering the bag machine, in order to match tensions. This can be accomplished by moving the cam laterally relative to the disk, so that when the clips are at their farthest spacing they are farther from or closer to the center. This has the effect of stretching the tape a bit more or less, so that there is more or less tape length between interruptions, and the tape is moving faster or slower.

The remainder of the line for producing draw tape bags shown in FIG. 5 is more fully described in the aforementioned applications. Briefly, a roll 38 feeds a continuous, extruded tube of polyethylene which has been slit and folded along a median longitudinal line. The material is drawn from the roll 38 by pinch rollers 39. These draw the folded film, forming the two opposing panels, through a hemmer 40 and through a punch 41 which forms the cut-outs in each panel. The continuous line of bags passes through the tape inserter 37 where the draw tape from the stretching apparatus of the present invention is inserted into each hem of the bag.

The continuous length of film with the draw tapes inserted in the hem thereof is advanced from the pinch rollers 39, through rollers 42 and a hem sealer 43, by means of a second pair of pinch rollers 44. As the length of continuous hem sealed film exits the hem sealer 43, it passes through a set of dancer rolls 45, to the seal cutter assembly 46. The reciprocating heat seal bar carries a knife edge into contact with the moving web in an intermittent action timed to form a heat seal down the sides of each bag at regular intervals along its length. After bonding, the seal bar also severs the continuous length of film through the center of the heat seal, thereby separating individual bags from the continuous length of film.

While a particular embodiment of the invention has been shown and described, various modifications are within the true spirit and scope of the invention. The appended claims are, therefore, intended to cover all such modifications.

What is claimed is:

1. Apparatus for producing thermoplastic tape having a relatively thin and narrow central portion between thick and wide end portions comprising:
   a plurality of rotating tracks;
   clips guided by said tracks;
   means for moving said clips outwardly along said tracks as they rotate; and
   means for feeding tape to said clips near the center of rotation and for removing the said tape from said clips at a greater radial distance from the center of rotation whereby said tape is stretched during rotation to produce said thin and narrow central portions of said tape.

2. The apparatus recited in claim 1 wherein said clips have a length equal to the length of the end portions of said tape so that the portion of the tape gripped by each clip is not stretched.

3. The apparatus recited in claim 1 wherein said tracks are slots in a rotating disk and wherein said clips are guided by said slots.

4. The apparatus recited in claim 3 wherein said means for moving said clips is a cam groove extending outwardly from near the center of rotation of said disk, said clips riding in said cam groove so that they move outwardly in said slots as said disk rotates.

5. The apparatus recited in claim 4 wherein said cam slot extends spirally from near the center of rotation of said disk outwardly toward the edge of said disk.

6. The apparatus recited in claim 1 and an oven, said tape being heated in said oven prior to insertion into said clips to produce smooth stretching and orientation of said tape.

7. The method of stretching thermoplastic tape to produce a relatively thin and narrow central portion between thick and wide end portions comprising:
   gripping said tape at spaced locations with clips:
   rotating said clips; and
   moving said clips radially outward as they rotate to stretch the tape between said clips to produce said thin and narrow central portions.

8. The method recited in claim 7 wherein the step of gripping includes gripping said tape throughout a length equal to said end portions and spacing said gripping by the unstretched length of the central portions of said tape.

9. The method recited in claim 7 wherein the step of rotating includes:
rotating a disk having a plurality of slots extending outwardly from the center of rotation of said disk; and
moving said clips outwardly along said slots as said disk rotates.

10. The method recited in claim 9 wherein the step of moving includes:
positioning said clips in a cam slot; and
rotating said disk to move said clips outwardly in said cam slot as said disk rotates.

* * * * *